S. MALES.

Cider-Mills.

No. 5,877. Reissued May 19, 1874.

Witness

W. M. Hunter

Edgar J. Gross

Inventor

Samuel Males

By F. Millward

Attorney

AM. PHOTO-LITHOGRAPHIC Co. N.Y. (OSBORNE'S PROCESS.)

UNITED STATES PATENT OFFICE.

SAMUEL MALES, OF CINCINNATI, OHIO.

IMPROVEMENT IN CIDER-MILLS.

Specification forming part of Letters Patent No. 52,583, dated February 13, 1866; reissue No. 5,877, dated May 19, 1874; application filed May 1, 1874.

*To all whom it may concern:*

Be it known that I, SAMUEL MALES, of Cincinnati, Hamilton county, State of Ohio, have invented a certain new and useful Improvement in Cider-Mills, of which the following is a specification:

My invention consists in a certain construction and arrangement of intermeshing rollers, by which they are made to mutually assist each other in feeding the apples, and retaining the broken pieces until effectually crushed between the segments of said rollers, the rollers being also fitted with gear-wheels which clear each other, thus maintaining them in complete efficiency.

Figure 1:
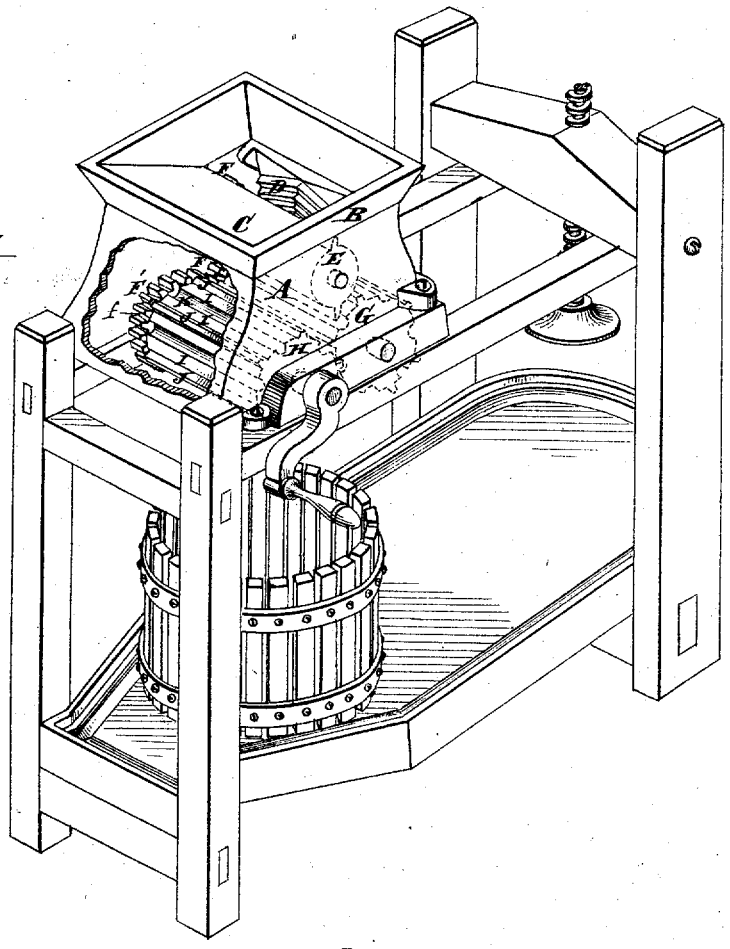
Figure 2:
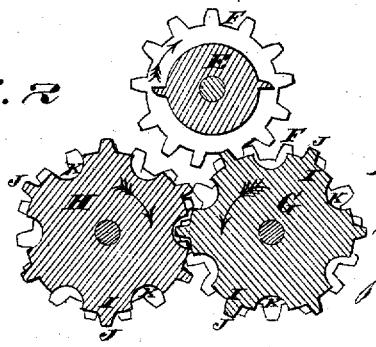

Figure 1 is a perspective view of a cider-mill embodying my improvement. Fig. 2 is a transverse section of my rollers.

A represents a customary inclosing-box, surmounted by a suitable hopper, B, whose chute C conducts the apples between a corrugated throat, D, and a breaking and feeding roller, E. One end of the roller E is furnished with cogs F, which cogs gear into similar cogs F′ on one of the crushing-rollers, whose cogs also gear into similar cogs on the end of a precisely similar crushing-roller, H. The periphery of each crushing-roller G and H is composed of a number of cylindrical segments, I, armed along the middle with ribs J, separated from each other by grooves K. Each rib J of one roller enters and sweeps around one of the grooves K in the other roller, and each rib J catches the broken pieces as they fall from the roller E, and, as it enters into the groove K in the other roller, holds the apple between the segments I, so that the apple is necessarily crushed between the segments and the cells thoroughly broken, more cider being thereby produced than can be obtained by the grating process.

The rollers H and G being both provided with ribs and grooves, great efficiency in the feeding and discharging process is obtained, requiring necessarily but a slight projection of rib and depth of groove, and crushing is done in the grooves as well as between the segments.

The bottoms *f* of the interdentil spaces are chamfered or sloped outward, so as to be deeper on the outside, and thus afford a way of escape for pomace falling between or upon the cogs, and the said chamfered spaces enable the cogs of one roller to clean the spaces of the other.

The mill being started, and apples being fed into the hopper, the said apples are carried down the chute C between the corrugated throat D and feed-roller E, between which they are broken into small pieces, and from which they drop on rollers G and H, whose ribs J catch and hold the fragments, and cause the segments of the coacting rollers to crush all the cells of the pomace; at the same time the ribs J act to completely strip the said pomace from said surfaces I and from the grooves K, so as to preserve the full efficiency of these parts at each succeeding revolution.

I claim—

1. The crushing-rollers H G, provided with cylindrical segments I, ribs J, and grooves K, substantially as and for the purpose specified.

2. In combination with the crushing-rollers H and G and break-roller E, the gear-wheels F F′ F″, with interdentil spaces whose bottoms *f* are chamfered or sloped outward, substantially as and for the purpose specified.

In testimony whereof I hereunto set my hand this 27th day of March, 1874.

SAMUEL MALES.

Witnesses:
F. MILLWARD,
EDGAR J. GROSS.